(12) United States Patent
Brown

(10) Patent No.: US 9,154,583 B2
(45) Date of Patent: Oct. 6, 2015

(54) METHODS AND DEVICES FOR IMPLEMENTING NETWORK POLICY MECHANISMS

(75) Inventor: Jeremy Brown, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1162 days.

(21) Appl. No.: 12/609,990

(22) Filed: Oct. 30, 2009

(65) Prior Publication Data

US 2011/0107391 A1     May 5, 2011

(51) Int. Cl.
*G06F 15/173*     (2006.01)
*H04L 29/06*     (2006.01)
*H04L 12/813*     (2013.01)

(52) U.S. Cl.
CPC ............... *H04L 69/16* (2013.01); *H04L 47/20* (2013.01); *H04L 63/0227* (2013.01); *H04L 69/161* (2013.01); *H04L 69/22* (2013.01)

(58) Field of Classification Search
USPC .......................................................... 709/240
See application file for complete search history.

(56) References Cited

U.S. PATENT DOCUMENTS

| 6,973,488 | B1 * | 12/2005 | Yavatkar et al. ............... 709/223 |
| 7,072,958 | B2 | 7/2006 | Parmar et al. |
| 7,313,237 | B2 | 12/2007 | Bahl et al. |
| 7,444,669 | B1 | 10/2008 | Bahl et al. |
| 7,478,161 | B2 | 1/2009 | Bernet et al. |
| 7,584,301 | B1 | 9/2009 | Joshi |
| 2003/0115246 | A1 | 6/2003 | Mahon et al. |
| 2003/0163697 | A1 * | 8/2003 | Pabla et al. ................... 713/171 |
| 2008/0052758 | A1 | 2/2008 | Byrnes |
| 2008/0123649 | A1 * | 5/2008 | Wang et al. ................... 370/392 |

* cited by examiner

*Primary Examiner* — Tauqir Hussain
(74) *Attorney, Agent, or Firm* — Greer, Burns & Crain, Ltd.

(57) ABSTRACT

Embodiments of the invention provide a network device for implementing a host-based network policy mechanism, having a port for receiving packets wherein each packet identifies a host and a destination, and a processing engine configured to inspect packets received on the port, wherein if at least one of the packets matches a predetermined pattern, a rule regulating packet transmission originating from the host is defined and applied against subsequent packets received on the port.

20 Claims, 2 Drawing Sheets

METHODS AND DEVICES FOR IMPLEMENTING NETWORK POLICY MECHANISMS

TECHNICAL FIELD

Embodiments of the present invention relate generally to computer network technology.

BACKGROUND

Network devices commonly employ policy mechanisms to limit certain types of behavior of clients connected to the device. One common policy mechanism is referred to as Quality of Service ("QoS"). QoS allows for the ability to provide different priority levels to different applications, users, or data flows, or to guarantee a certain level of performance to a data flow. For example, a required bit rate, delay, jitter, packet dropping probability and/or bit rate error may be guaranteed. When implementing QoS, as packets are sent through a network, typically a network device (e.g., a network switch) monitors packets to inspect for certain types of traffic.

As an example, a QoS policy can be implemented and configured to prevent overuse of a network's bandwidth by file-sharing programs. Consider two clients A and B residing on a network wherein client A negotiates a connection with client B using a file-sharing protocol. During this initial connection, (commonly referred to as a handshake process), both clients A and B use a designated port to exchange packets to initiate and complete the handshake process. Since file-sharing programs commonly use one of a small number of select ports, the QoS policy can be configured to recognize activity of such ports and limit or block packet transmissions from client A to Client B on the identified port accordingly.

As shown above, policy mechanisms provide the ability to limit or block certain classes or types of traffic. Traditional policy mechanisms of this type are statically configured in that they are configured manually (e.g., by an administrator), and will only affect the specific types of traffic that they are programmed to affect.

DETAILED DESCRIPTION

While QoS and other policy mechanisms target and regulate specific types of traffic, often client and/or programs running on clients can be designed to circumvent these traffic blocking or limiting techniques. For example, consider again the example described above wherein clients A and B establish a connection using a file-sharing program and subsequently exchange data. While the clients may use a well-known port or other identifiable information to facilitate the handshake process and negotiate and connection, the clients can also designate other less common ports to use for exchanging the actual data (following the completion of the handshake process). As such, the bulk of the communication will occur over a less common (possibly even random) port. The above described examples of limiting a particular type of traffic (i.e., traffic from A to B over port C), will not address the traffic at issue. Indeed, in this instance, an administrator would need to monitor the traffic and define a rule to limit traffic from A to B over the newly identified port.

Embodiments of the invention provide a network device which implements host-based network policy mechanisms. Such policies are distinguishable from those known in the prior art as they provide for host-based, rather than traffic-based techniques. Consider again the file-sharing example described above. As noted, since the file-sharing protocol uses one well-known port (e.g., a TCP port) to facilitate the handshake and a second, different port to transmit the bulk of the data, the traffic-based technique fails to appreciate the latter group of traffic as it only concerned with traffic being sent over the first port. In a preferred embodiment of the present invention, the initial handshake process identifies a particular host to which traffic limitations are to be applied. Therefore, regardless of which port the host uses for subsequent data transfers, the host is effectively limited based on the implemented policy mechanism.

Figure 1:
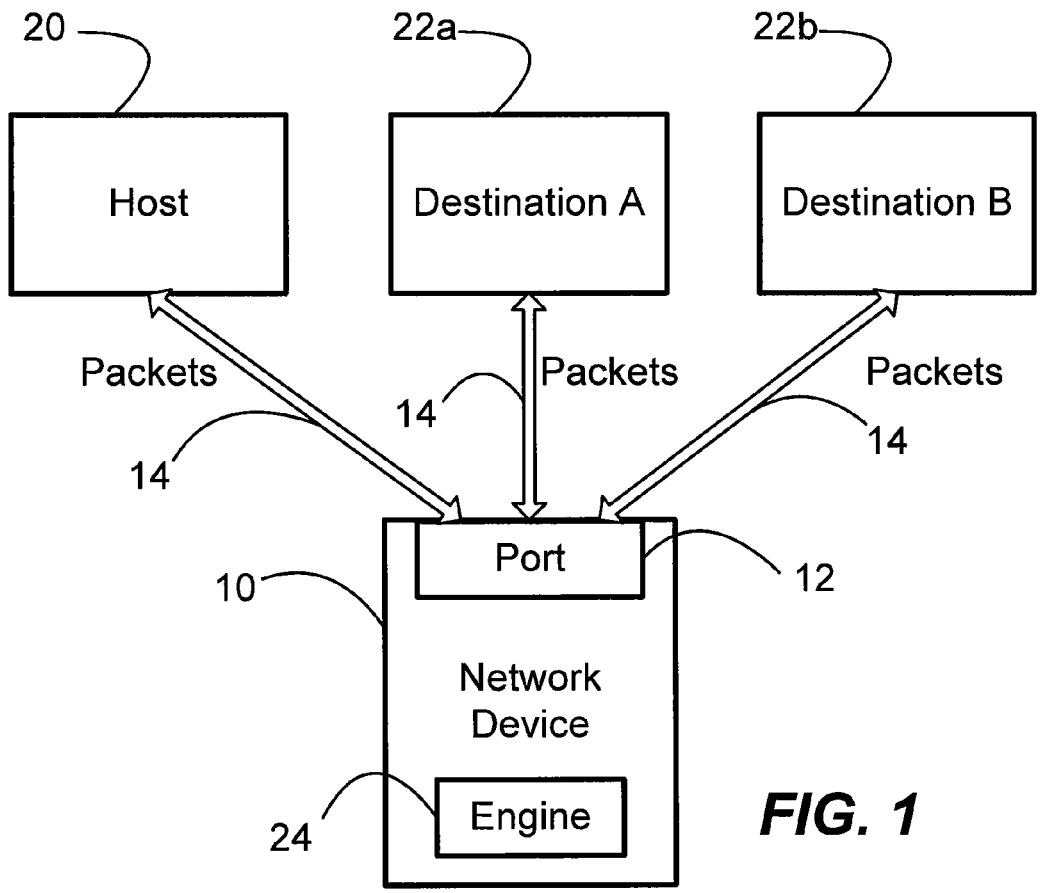
FIG. 1 is a first preferred embodiment of a network device of the present invention.
Figure 2:
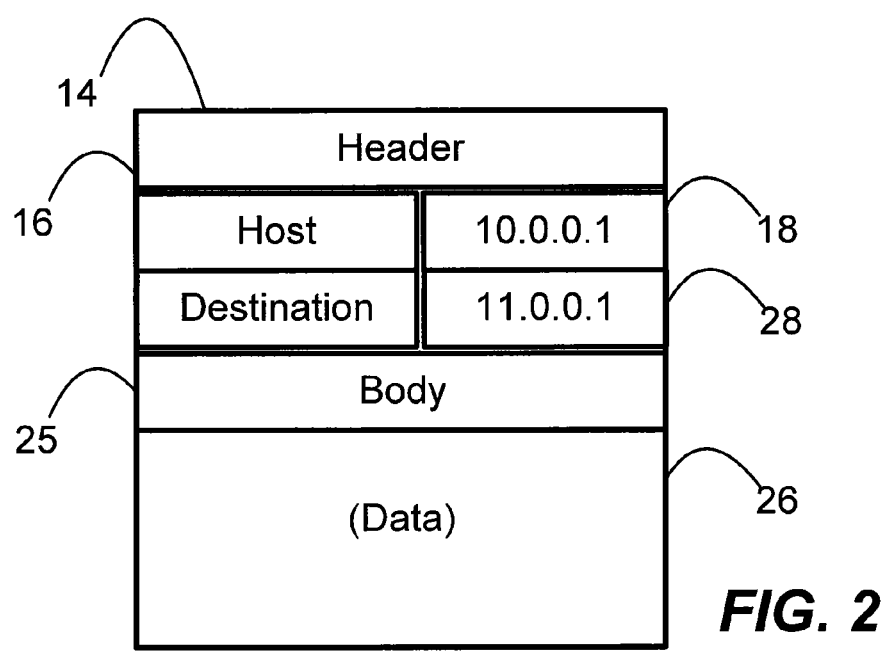
FIG. 2 is a detailed view of a packet shown in FIG. 1.

Referring now to FIGS. 1 and 2, a preferred embodiment network device 10 for implementing a host-based network policy mechanism is shown. Note that throughout this specification, all references to "a," "an," or "the" refer to at least one unless otherwise specified.

Included on the network device 10 is a port 12 for receiving packets 14. Notably, the network device 10 is not limited to any particular type of device, but is preferably a network switch such as a layer-2 or layer-3 switch. Included in a header portion 16 of each packet 14 is a host identifier 18, which identifies a host client 20 from which the packet originates. Two potential destinations clients 22a and 22b are also shown. Notably, each packet will only have a single destination client. Note, typically networks are more complex and have many additional components, however for the sake of clarity, a stripped down version is shown.

Further included in the network device 10 is a processing engine 24, which is configured to inspect the packets 14 received on the port 12. During packet inspection, the processing engine 24 considers each packet to determine if it matches a predetermined pattern. If a match is found, a rule regulating packet transmission originating from the host 20 (as identified by the host identifier 18 in the packet 14) is defined and applied against subsequent packets received on port 12 of the network device 10.

The predetermined pattern used to identify certain types of packets is flexible and can be set accordingly by an administrator or another entity depending on the system using the policy mechanism. In general, the pattern is configured to identify known harmful packet patterns or otherwise suspicious activity.

For example, consider again the file-sharing (also referred to as peer-to-peer) example as described above. To detect such file-sharing activity, a predetermined pattern would be configured to identify packets used in the handshake or negotiation process. Such an identification data would typically be made by looking within a body portion 25 of the packet 14 wherein the payload data 26 would reside. Further, since the handshake process typically takes place over one of a few select port numbers (either on the host 20 or the destination 22 side), such information can be used to further limit the pattern. The pattern is therefore adjustable depending on the level of desired tolerance. Indeed, requiring the use of certain ports likely reduces false-positive matches. However, by adding further pattern requirements, there is an increased risk of overlooking certain traffic sought to be targeted. Due to these balancing interests, the administrator or other entity is provided with the ability to customize the pattern based on a desired level of tolerance and accuracy.

Another example of suspicious activity is the presence of communication between clients who are not expected to communicate. While network systems may include servers that are commonly accessed by clients on the network, often networks have "hidden" servers, which are not typically accessed at all by clients (except during diagnostic sessions with special administrator privileges). As such, any attempt to communicate with such servers by a client is an indication of suspicious activity. In this example, notably the pattern looks not only to the host identifier field in the packet header, but also the destination identifier field 28 to identify is such a communication request is being made.

Once it is determined that a packet matches a predetermined pattern, a rule regulating packet transmission originating from the host is defined and applied against subsequent packets 14 received on the port 12 of the network device 10. Notably, contrary to the techniques described in the prior art, the rule is a host-based rule, rather than being traffic-based. Examples of such host-based rules include limiting packets sent from a host to a particular predetermined rate (e.g., 100 kbps). In addition, the rule could block all traffic originating from a particular port on the host or even block all traffic originating from a particular host entirely. The combination of the patterns and rules are used to establish the described policy mechanism.

One method of configuring the network device 10 with a pattern-rule policy is through a basic command line programming interface. Notably, other methods (e.g., graphical user interfaces) are also considered, but for simplicity, examples will be shown using a command line interface. In a first example, consider entry of the following pattern and rule combination into the network device 10:

<traffic from host 10.0.0.1 to destination 11.0.0.1 disable-host port>

Such an entry seeks packets matching the pattern of being sent from a host client with IP address 10.0.0.1 to a destination client with IP address 11.0.0.1. When a packet of this type is detected, a rule disabling the port used by the host is applied. One use of such a pattern-rule combination is for when a particular port is expected to be used for certain unwanted activity (i.e., file-sharing handshake protocol). As such, blocking the port would likely prevent the host from establishing further such connections with the destination client. However, note that since the rule is host-based, the rule will also apply to communications between the host and other destination clients. Indeed, consider the diagram in FIG. 1 and presume the destination IP address 11.0.0.1 represents Destination A 22a. Once a packet matches the above described pattern, the port used on host 20 will be disabled meaning it cannot communicate with Destination A 22a using that port. However, since the rule applies to the port of the host 20 (i.e., it is a host-based rule and not merely a traffic-based rule), the host also cannot communicate with Destination B 22b (or any other destination client) over that port either.

The next example uses the same pattern, but applies the rule of limiting the host rather than disabling a port:

<traffic from host 10.0.0.1 to destination 11.0.0.1 limit-host 100 kbps>

One use of this example is likely to address the file-sharing design around the tactic described above wherein a client facilitates a handshake through one port, but transfers data through another. By limiting the entire host 20, it is irrelevant which port the host is using as all traffic from that host will be limited to 100 kbps.

In a third example, all traffic from a particular host (on any port) is disabled:

<traffic from host 10.0.0.1 to destination 11.0.0.1 disable-host>

This is a rather extreme solution, but still may be appropriate depending on the circumstances or activity sought to be regulated. As described earlier, often a network will have two entities (e.g., host and hidden server), which have absolutely no reason to communicate with each other. As such, if the host attempts to communicate with the hidden server, it may be appropriate to block all outgoing traffic from the host. Such a rule can serve to prevent the spread of malicious data (e.g., viruses and worms), which attempt to propagate through web servers.

For comparison, consider these pattern-rule pairs against the one shown below, which represents a prior art solution:

<traffic from host 10.0.0.1 to destination 11.0.0.1 limit 100 kbps>

Notice in this example that the rule is not host-based, in that it does not enforce any limitation with respect to a particular host. Instead, the rule merely provides for limiting traffic from host 10.0.0.1 to destination 11.0.0.1. Of course, traffic sent from the same host to another destination will completely escape the limitation of this rule. Under this technique, an administrator would conceivably need to create an almost endless number of rules to address any action by the host.

Further, referring back to the issue of virus and worms as identified above, notably when using a traditional static traffic-based policy, traffic to a particular web server could be blocked because once the IP address from the host is known, future traffic from the host to the web server could be identified and blocked accordingly. However, such a policy does not serve to prevent the spread of the worm or virus to other clients (and potentially even eventually back to the server from a different host as it propagates through a chain of clients). Embodiments of the present invention seek to provide increased protection by defining host-based rules. With a host-based reaction to a policy violation, the infected host itself could be disconnected (e.g., by blocking a port of the host or by blocking the host entirely), thereby effectively disconnecting the host from the network and preventing the spread of the virus or worm.

Figure 3:
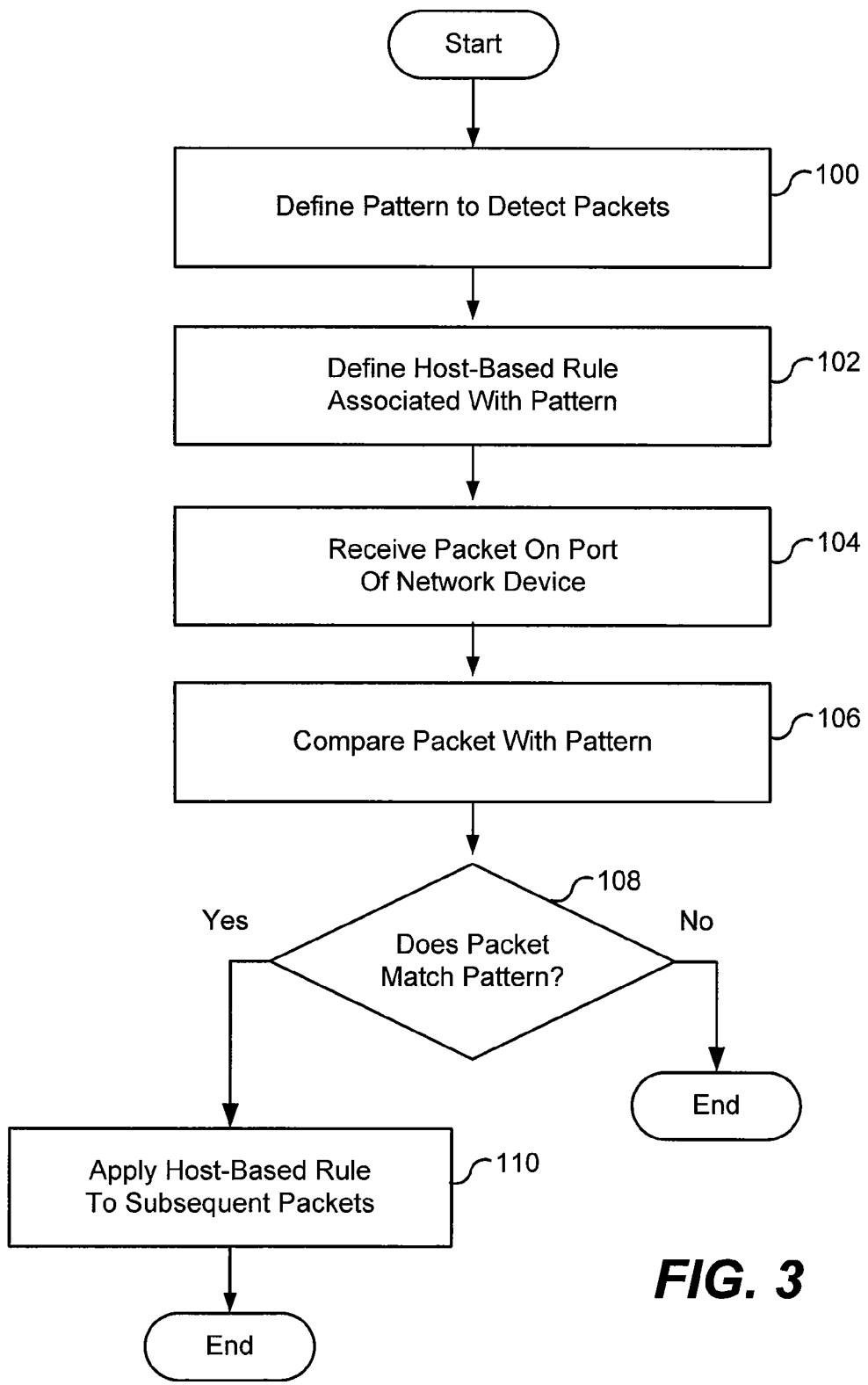
FIG. 3 is a flowchart depicting a method of a first preferred embodiment of the present invention.

Referring now to FIG. 3, a preferred embodiment of the present invention will now be discussed with respect to the steps depicted in flow chart form. To implement this preferred method of implementing a host-based policy mechanism, in step 100, a pattern is defined and configured to detect packets having select predetermined characteristics. In step 102 a host-based rule associated with the pattern is defined. In step 104, a packet 14 is received on a port 12 of a network device 10. In step 106, the packet 14 is compared to the pattern. In step 108, a query is performed to determine if the packet 14 matches the pattern. If a match is found, in step 110 the host-based rule is applied to subsequent packets 14 received on the port 12 of the network device 10.

The particular patterns, rules, and combinations thereof are flexible and are configured depending on the needs of the system. Examples of such patterns and rules include those discussed above with respect to the network device 10, but notably the invention is not limited to the specific enumerated examples.

Further, each of the steps described above are preferably carried out by the processing engine 24, which can be implemented using, among other things, hardware, software (i.e., instructions stored on a computer-readable medium), or a combination of both. However, notably the steps can also be performed manually and/or by other components in or associated with the network device 10.

In preferred embodiments of the present invention, the network device 10 is a network switch since switches are likely to receive all network traffic originating from the clients on the network and therefore is in an appropriate location to effectively monitor packets and carry out the pattern detection and rule enforcement process. However, any network device configured to receive packets is also contemplated and could be used instead of a network switch. Further, it is noted that the steps described above could be performed by a network device stationed outside the network, provided there is some communication to the packets being sent from the networked clients so as to facilitate the desired packet monitoring and other associated operations.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A network device for implementing a host-based network policy mechanism, comprising:
   a port for receiving packets wherein each said packet identifies a host; and
   a processing engine configured to inspect packets received on said port, wherein if at least one of said packets matches a predetermined pattern, a rule regulating packet transmission originating from said host is defined and applied against subsequent packets received.

2. The network device of claim 1 wherein said packet further identifies a destination and said predetermined pattern identifies packets having a particular host and destination pair.

3. The network device of claim 1 wherein said predetermined pattern identifies packets representing a handshake protocol for a peer-to-peer application.

4. The network device of claim 1 wherein said packet further identifies a destination and said predetermined pattern identifies packets having a particular host or destination port.

5. The network device of claim 1 wherein said rule blocks all packets originating from a particular port on said host.

6. The network device of claim 1 wherein said rule blocks all packets originating from said host.

7. The network device of claim 1 wherein said rule limits packets originating from said host to a predetermined rate.

8. The network device of claim 1 wherein said rule establishes a priority level for all packets originating from said host.

9. The network device of claim 1 wherein the network device is a network switch.

10. A method of implementing a host-based policy mechanism, comprising the steps of:
    defining a pattern configured to detect packets having select predetermined characteristics;
    defining a host-based rule associated with said pattern;
    receiving a packet on a port of a network device;
    comparing the packet to the pattern;
    if the packet matches the pattern, applying the host-based rule to subsequent packets received on the port of the network device.

11. The method of claim 10 wherein the pattern identifies packets having a particular host and destination pair.

12. The method of claim 10 wherein the pattern identifies packets representing a handshake protocol for a peer-to-peer application.

13. The method of claim 10 wherein the pattern identifies packets having a particular host or destination port.

14. The method of claim 10 wherein the rule blocks all packets originating from a particular port on the host.

15. The method of claim 10 wherein the rule blocks all packets originating from the host.

16. The method of claim 10 wherein the rule limits packets originating from the host to a predetermined rate.

17. The method of claim 10 wherein the rule establishes a priority level for all packets originating from the host.

18. The method of claim 10 wherein the network device is a network switch.

19. A computer-readable device associated with a network device, containing instructions for executing the steps of:
    receiving a packet on a port of the network device;
    comparing the packet to a predetermined pattern configured to identify select predetermined packet characteristics;
    if the packet matches the pattern, applying a host-based rule associated with the pattern to subsequent packets received on the port of the network device.

20. The computer-readable device of claim 19 wherein the network device is a network switch.

* * * * *